(12) United States Patent
Miyauchi et al.

(10) Patent No.: US 7,072,170 B2
(45) Date of Patent: Jul. 4, 2006

(54) MULTILAYER CERAMIC CAPACITOR

(75) Inventors: Mari Miyauchi, Chuo-ku (JP);
Kazunori Noguchi, Chuo-ku (JP);
Takako Hibi, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 25 days.

(21) Appl. No.: 10/996,424

(22) Filed: Nov. 26, 2004

(65) Prior Publication Data

US 2005/0117274 A1 Jun. 2, 2005

(30) Foreign Application Priority Data

Nov. 28, 2003 (JP) ............................. 2003-399006

(51) Int. Cl.
*H01G 4/06* (2006.01)

(52) U.S. Cl. .................................. 361/321.2; 361/311

(58) Field of Classification Search ........ 361/311–313, 361/320, 321.1, 321.2, 321.3, 322
See application file for complete search history.

(56) References Cited

U.S. PATENT DOCUMENTS

| 6,205,014 B1 * | 3/2001 | Inomata et al. ............. 361/312 |
| 6,600,645 B1 * | 7/2003 | Lauf et al. .................. 361/311 |
| 6,839,221 B1 * | 1/2005 | Sugimoto et al. ........ 361/321.2 |

FOREIGN PATENT DOCUMENTS

| EP | 1347476 A2 * | 9/2003 |
| JP | A 2003-124049 | 4/2003 |

* cited by examiner

*Primary Examiner*—Eric W. Thomas
(74) *Attorney, Agent, or Firm*—Oliff & Berridge, PLC

(57) ABSTRACT

There is provided a multilayer ceramic capacitor 1, having an internal electrode layer 3 and an interlayer dielectric layer 2 having a thickness of 3.5 μm or less, wherein the interlayer dielectric layer 2 is composed of contact dielectric particles 2a contacting said internal electrode layer and noncontact dielectric particles 2b not contacting said internal electrode layer; and when assuming that an average particle diameter of the contact dielectric particles 2a is D50e and an average particle diameter of the noncontact dielectric particles 2b is D50d, D50e<0.450 μm and (D50e/D50d)=1.20 to 3.00 (note that 1.20 and 3.00 are excluded) are satisfied, wherein an improvement of a bias characteristic at 85° C. can be expected even when the interlayer dielectric layer 2 is made thin.

1 Claim, 3 Drawing Sheets

MULTILAYER CERAMIC CAPACITOR

BACKGROUND OF THE INVENTION

1. Field of the Invention

The present invention relates to a multilayer ceramic capacitor.

2. Description of the Related Art

In recent years, in a multilayer ceramic capacitor, a dielectric layer (interlayer dielectric layer) between facing internal electrode layers has become thinner, and the number of dielectric particles composing the interlayer dielectric layer has become smaller to realize a larger capacity with a compact body, and characteristics of a capacitor have been largely affected: by control of the particle structure.

For example, in the patent article 1, there has been proposed a technique for realizing high dielectric permittivity without deteriorating electric characteristics by controlling the structure of an interlayer dielectric layer in a multilayer ceramic capacitor composed of a dielectric layer and an internal electrode layer. In this technique, the interlayer dielectric layer includes a plurality of dielectric particles, and the plurality of dielectric particles are composed of contact dielectric particles contacting the internal electrode layer and noncontact dielectric particles not contacting the internal electrode layer. An average particle diameter D50e of the contact dielectric particles is larger comparing with an average particle diameter D50d of the noncontact dielectric particles, and the structure to satisfy (D50e/D50d) =1.05 to 1.20 is preferably applied. Note that the patent article 1 describes to use an internal electrode layer paste added with an additive component for accelerating grain growth, but a composition of the additive component is different from that of dielectric particles.

In the technique disclosed in the patent article 1, it is liable that characteristics (a bias characteristic at 85° C.) of an obtained capacitor declines when the interlayer dielectric layer is made thin, for example, to 3.5 μm or less.

Patent Article 1: the Japanese Unexamined Patent Publication No. 2003-124049

SUMMARY OF THE INVENTION

An object of the present invention is to provide a multilayer ceramic capacitor, wherein an improvement of a bias characteristic at 85° C. can be expected even when the interlayer dielectric layer is made thin.

To attain the above object, according to the present invention, there is provided a multilayer ceramic capacitor, having an internal electrode layer and an interlayer dielectric layer having a thickness of 3.5 μm or less, wherein:

said dielectric layer is composed of contact dielectric particles contacting said internal electrode layer and noncontact dielectric particles not contacting said internal electrode layer; and when assuming that an average particle diameter of the contact dielectric particles is D50e and an average particle diameter of the noncontact dielectric particles is D50d, D50e<0.450 μm and (D50e/D50d)=1.20 to 3.00 (note that 1.20 and 3.00 are excluded) are satisfied.

A multilayer ceramic capacitor according to the present invention can be produced, for example, by a method explained below. Note that a production method of the multilayer ceramic capacitor of the present invention is not limited to the method below.

The method includes a step of firing a multilayer body obtained by using a dielectric layer paste including a dielectric material and an internal electrode layer paste including a main component of an adding dielectric material having the same composition as that of the dielectric material, an average particle diameter of 0.01 to 0.2 μm, and a pH of 7.5 or more.

The firing step is a step for raising an atmosphere temperature toward a firing holding temperature T2, holding the T2 for a predetermined time, then, lowering. The respective steps of temperature raising, holding T2 and temperature lowering are not particularly limited in detail.

Effects

According to the present invention, a multilayer ceramic capacitor, wherein an improvement of a bias characteristic at 85° C. (a change amount of a capacity when applying a predetermined bias voltage at 85° C. comparing with the capacity at the room temperature) can be expected even when the interlayer dielectric layer is made thin, is provided.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Below, an embodiment of the present invention will be explained based on the attached drawings.

In the present embodiment, as a multilayer ceramic capacitor comprising an internal electrode layer and a dielectric layer, an explanation will be made on a multilayer ceramic capacitor, wherein a plurality of internal electrode layers and dielectric layers are alternately stacked, as an example.

Multilayer Ceramic Capacitor

Figure 1:
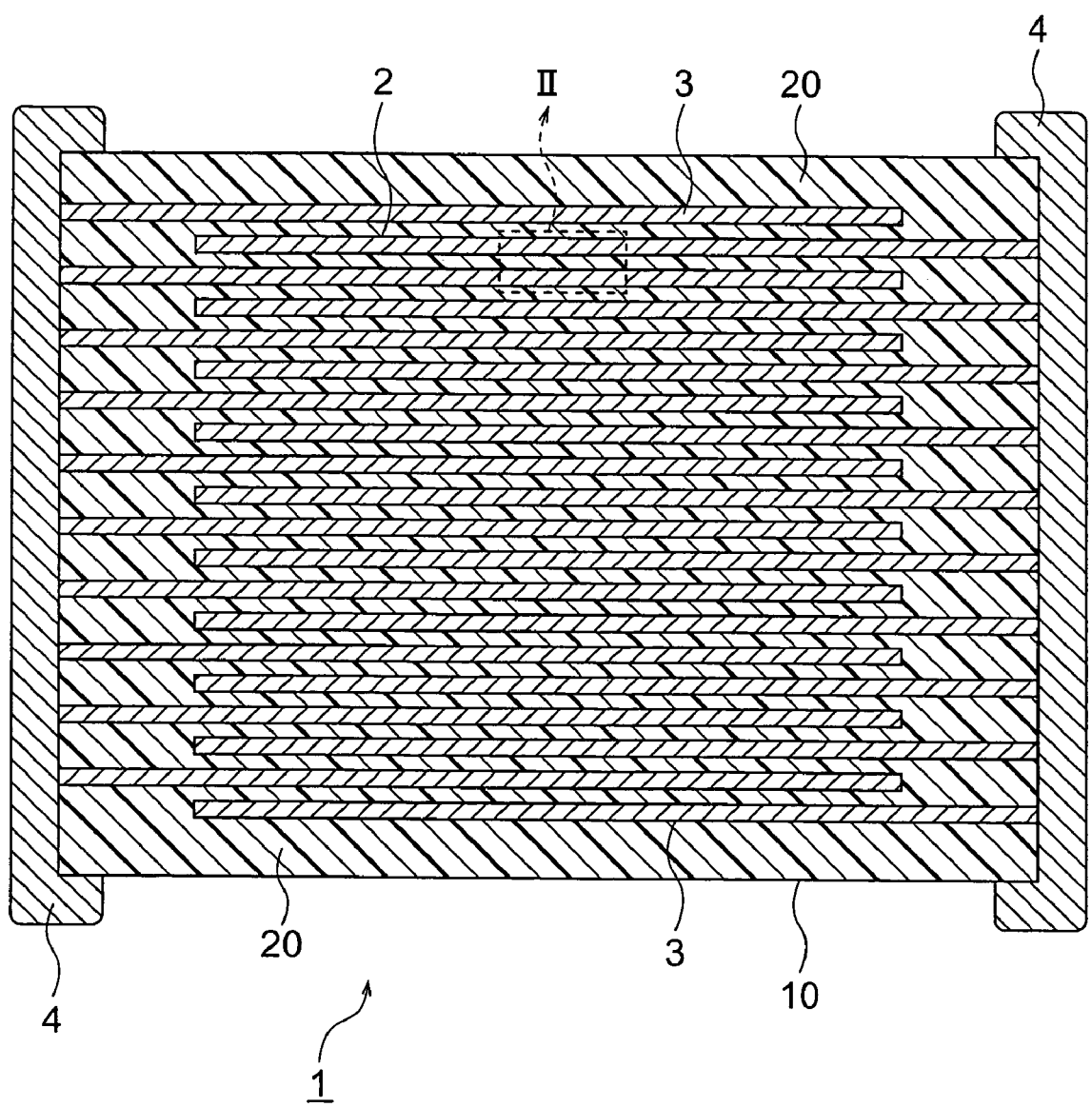
FIG. 1 is a schematic sectional view of a multilayer ceramic capacitor according to an embodiment of the present invention.

As shown in FIG. 1, a multilayer ceramic capacitor 1 according to an embodiment of the present invention comprises a capacitor element body having the configuration of alternately stacking interlayer dielectric layers 2 and internal electrode layers 3.

On both end portions of the capacitor element body 10, a pair of external electrodes 4 are formed to connect respectively to the internal electrode layers 3 alternately arranged inside the element body 10.

The internal electrode layers 3 are stacked, so that the respective end faces are alternately exposed to surfaces of two facing end portions of the capacitor element body 10. The pair of external electrodes 4 are formed on both end portions of the capacitor element body 10 and connected to exposed end faces of the alternately arranged internal electrode layers 3 to compose a capacitor circuit.

A shape of the capacitor element body 10 is not particularly limited and normally is a rectangular parallelepiped shape. Also, dimensions thereof are not particularly limited and may be suitable dimensions in accordance with the use object, but normally are a length of (0.6 to 5.6 mm)×a width of (0.3 to 5.0 mm)×a height of (0.3 to 1.9 mm) or so.

In the capacitor element body 10, external dielectric layers 20 are arranged on both external end portions in the stacking direction of the internal electrode layers 3 and interlayer dielectric layers 2 to protect inside the element body 10.

Interlayer Dielectric Layer and External Dielectric Layer

A composition of the interlayer dielectric layer 2 and the external dielectric layer 20 is not particularly limited in the present invention, but is composed, for example, of a dielectric ceramic composition below.

A dielectric ceramic composition of the present embodiment is, for example, a dielectric ceramic composition including barium titanate as a main component.

As subcomponents to be included with the main component in the dielectric ceramic composition, those containing at least one kind of Mn, Cr, Si, Ca, Ba, Mg, V, W, Ta, Nb, R (R is Y, at least one kind of rare earth elements), an oxide of Si, and compounds to be oxides by firing, may be mentioned. By adding a subcomponent, characteristics as a capacitor can be obtained even by firing in a reduced atmosphere. Note that as an impurity, a minute amount of components, such as C, F, Li, Na, K, P, S and Cl, may be contained by about 0.1 wt % or less. Note that a composition of the interlayer dielectric layer 2 and the external dielectric layer 20 is not limited to the above in the present invention.

In the present embodiment, it is preferable to use those having a composition below as the interlayer dielectric layer 2 and the external dielectric layer 20. The composition is to contain barium titanate as a main component, a magnesium oxide and an oxide of a rare earth element as subcomponents, at least one kind selected from a barium oxide and a calcium oxide, and at least one kind selected from a silicon oxide, a manganese oxide, a vanadium oxide and a molybdenum oxide as still other subcomponents. Also, when expressing a barium titanate in terms of $BaTiO_3$, a magnesium oxide in terms of $MgO$, an oxide of a rare earth element in terms of $R_2O_3$, a barium oxide in terms of $BaO$, a calcium oxide in terms of $CaO$, a silicon oxide in terms of $SiO_2$, manganese oxide in terms of $MnO$, vanadium oxide in terms of $V_2O_5$ and molybdenum oxide in terms of $MoO_3$, respectively; ratios with respect to 100 moles of $BaTiO_3$ are $MgO$ by 0.1 to 3 moles, $R_2O_3$ by more than 0 mol but not more than 5 moles, $BaO+CaO$ by 2 to 12 moles, $SiO_2$ by 2 to 12 moles, $MnO$ by more than 0 mole but not more than 0.5 mole, $V_2O_5$ by 0 to 0.3 mole and $MoO_3$ by 0 to 0.3 mole.

A thickness of the interlayer dielectric layer 2 is made to be as thin as preferably 3.5 μm or less and more preferably 2.5 μm or less. In the present embodiment, a bias characteristic at 85° C. of the capacitor 1 is improved even when the thickness of the interlayer dielectric layer 2 is made thin as such.

Note that the number of stacked layers of the interlayer dielectric layer 2 may be suitably determined in accordance with the object and use, but normally is as large as 50 layers or more in many cases.

Figure 2:
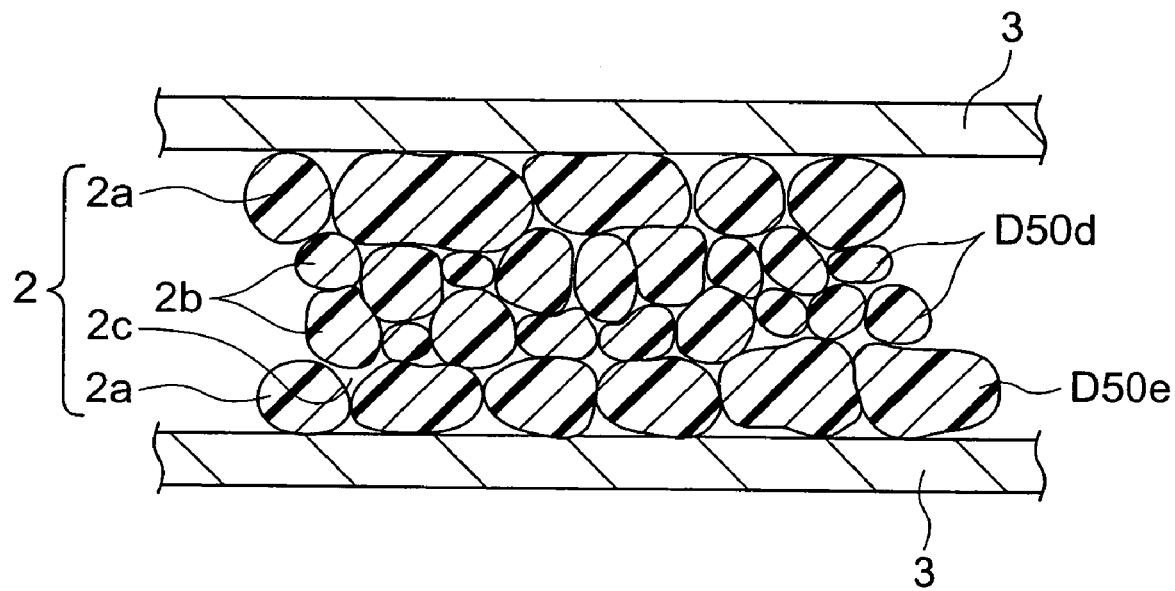
FIG. 2 is an enlarged sectional view of a key part of a dielectric layer shown in FIG. 1.

As shown in FIG. 2, the interlayer dielectric layer 2 comprises at least dielectric particles (contact dielectric particles) 2b contacting the internal electrode layer 3, dielectric particles (noncontact dielectric particles) 2b not contacting the internal electrode layer and a grain boundary phase 2c. The contact dielectric particles 2a contact one of a pair of internal electrode layers 3 sandwiching the interlayer dielectric layer 2 including the contact dielectric particles 2a, and do not contact the both. Here, an average particle diameter of the contact dielectric particles 2a is indicated by D50e, and an average particle diameter of the noncontact dielectric particles 2b is indicated by D50d. At this time, in the present embodiment, the ratio of D50e and D50d (D50e/D50d) satisfies 1.20 to 3.00 (note that 1.20 and 3.00 are excluded). Preferably it satisfies 1.30 to 2.50 and more preferably 1.30 to 2.32. When the (D50e/D50d) value is too small, a sufficient effect of improving the bias characteristic at 85° C. cannot be obtained when the interlayer dielectric layer 2 is made thin, while when too large, there arise disadvantages, such that the defective rate of initial insulation resistance (IR) increases, etc.

The D50e is less than 0.450 μm, preferably 0.300 μm or less. Even when the ratio of D50e and D50d (D50e/D50d) is in a suitable range, when the D50e is too great, the effect of improving the bias characteristic at 85° C. is deteriorated. On the other hand, when the D50e is too small, it becomes difficult to set the (D50e/D50d) value in a suitable range, therefore, the lower limit of the D50e is preferably 0.150 μm.

The D50d is preferably 0.050 to 0.300 μm, more preferably 0.100 to 0.200 μm. When the D50d is too great, it may cause disadvantages, such that the insulation resistance defective rate becomes high, etc. when making the dielectric layer thin. When the D50d is too small, a sufficient electrostatic capacity as a capacitor cannot be obtained.

The D50e and D50d are defined as below. The "D50e" is a value obtained by cutting in the dielectric stacking direction, measuring an average area of a section shown in FIG. 2 of 300 or more of dielectric particles 2a contacting an internal electrode, calculating the diameter by a diameter of the equivalent circle and multiplying the result with 1.5. The "D50d" is a value obtained by measuring an average area of a section shown in FIG. 2 of 300 or more of dielectric particles 2b not contacting an internal electrode, calculating the diameter by a diameter of the equivalent circle and multiplying the result with 1.5.

Note that the D50e and D50d here mean average particle diameters of the contact dielectric particles 2a and noncontact dielectric particles 2b in the interlayer dielectric layer 2 (a portion contributing to an electrostatic capacity) sandwiched between the internal electrode layers 3.

The grain boundary phase 2c normally comprises an oxide of a material composing the dielectric material or internal electrode material, an oxide of a separately added material and, furthermore, an oxide of a material to be mixed as an impurity in a step.

Internal Electrode Layer

The internal electrode layer 3 shown in FIG. 1 is composed of a base metal conductive material substantially serving as an electrode. As a base metal to be used as a conductive material, Ni or a Ni alloy is preferable. As a Ni alloy, an alloy of Ni and at least one kind selected from Mn, Cr, Co, Al, Ru, Rh, Ta, Re, Os, Ir, Pt and W, etc. is preferable, and a content of Ni in the alloy is preferably 95 wt % or more. Note that Ni or the Ni alloy may contain a variety of minute amount of components, such as P, C, Nb, Fe, Cl, B, Li, Na, K, F and S, by about 0.1 wt % or less.

In the present embodiment, a thickness of the internal electrode layer 3 is made thin to preferably 2.0 μm or less, more preferably 1.2 μm or less.

External Electrode

As the external electrode 4 shown in FIG. 1, at least one kind of Ni, Pd, Ag, Au, Cu, Pt, Rh, Ru and Ir, etc. or an alloy of these may be normally used. Normally, Cu, a Cu alloy, Ni or a Ni alloy, etc., Ag, a Ag—Pd alloy, an In—Ga alloy, etc. are used. A thickness of the external electrode 4 may be suitably determined in accordance with use, but normally 10 to 200 μm or so is preferable.

Production Method of Multilayer Ceramic Capacitor

Next, an example of a production method of the multilayer ceramic capacitor 1 according to the present embodiment will be explained.

(1) First, a dielectric layer paste to compose the interlayer dielectric layer 2 and the external dielectric layer 20 shown in FIG. 1 after firing and an internal electrode layer paste to compose the internal electrode layer 3 shown in FIG. 1 after firing are prepared.

Dielectric Layer Paste

The dielectric layer paste is produced by kneading a dielectric material and organic vehicle.

A dielectric material may be suitably selected from a variety of compounds to be composite oxides and oxides, such as carbonate, nitrate salt, hydroxides and organic metal compounds, and mixed for use. The dielectric material is normally used as powder having an average particle diameter of 0.4 μm or less, preferably 0.1 to 3.0 μm or so.

An organic vehicle contains a binder and a solvent. As a binder, a variety of normal binders, for example, ethyl cellulose, polyvinyl butyral and an acrylic resin, etc. may be used. The solvent is not particularly limited, and terpineol, acetone, toluene, xylene, ethanol and other organic solvents are used.

The dielectric layer paste may be formed by kneading the dielectric material and vehicle obtained by dissolving a water-soluble binder in water. The water-soluble binder is not particularly limited, and polyvinyl alcohol, methyl cellulose, hydroxyl ethyl cellulose, water-soluble acrylic resin and emulsion, etc. may be used.

A content of respective components in the dielectric layer paste is not particularly limited and the dielectric paste may be produced to contain, for example, about 1 to 50 wt % of the solvent.

The dielectric layer paste may contain additives selected from a variety of dispersants, plasticizers, dielectrics, subcomponent compounds, glass frits, insulators, etc. in accordance with needs. When adding these additives to the dielectric layer paste, the total content is preferably made to be about 10 wt % or less.

Internal Electrode Layer Paste

In the present embodiment, the internal electrode layer paste is produced by kneading a conductive material, a main component of an adding dielectric material and an organic vehicle.

As the conductive material, Ni, a Ni alloy, furthermore, a mixture of these are used. A shape of such conductive materials is not particularly limited, and may be a spherical shape, a scale like shape, or a combined shape of these. Also, conductive materials having an average particle diameter of 0.5 μm or less, preferably 0.01 to 0.4 μm or so are supposed to be normally used in the case of a spherical shape. It is to realize a thin layer on a higher level. The conductive material is contained in the internal electrode layer paste preferably by 35 to 60 wt %.

A main component of the adding dielectric material exhibits an effect of suppressing sintering of internal electrodes (conductive material) in the firing process. A main component of the adding dielectric material preferably has the same composition as that of the dielectric material included in the above dielectric layer paste. As a result of having the same composition, change of a composition of the dielectric layer due to dispersion from the internal electrode layer to the dielectric layer is not caused. The main component of the adding dielectric material preferably has a pH of a specific range. It was found by the present inventors that by using a dielectric material having a specific pH for adding, the ratio of D50e/D50d became large and a bias characteristic at 85° C. of a finally obtained capacitor 1 could be improved. A pH of the main component of the adding dielectric material (particularly, a main component material contained in the dielectric material) is preferably 7.5 or more, more preferably 8 to 11. When the pH is too low, an effect of improving the bias characteristic at 85° C. cannot be obtained. Also, an average particle diameter of the main component of the adding dielectric material may be the same as particle diameters of the dielectric material included in the dielectric layer paste, but the smaller the more preferable, and is preferably 0.01 to 0.2 μm, particularly preferably 0.01 to 0.15 μm. The main component of the adding dielectric material included in the internal electrode layer paste is preferably 5 to 30 wt %, more preferably 10 to 20 wt % with respect to the conductive material. When the main component of the adding dielectric material is too small, an effect of suppressing sintering of the conductive material declines, while when too much, continuity of the internal electrodes becomes deteriorated. Namely, when the main component of the adding dielectric material is too small or too much, disadvantages, such that a sufficient electrostatic capacity as a capacitor cannot be secured, may arise in either of the cases.

The organic vehicle contains a binder and a solvent.

As a binder, for example, ethyl cellulose, an acrylic resin, polyvinyl butyral, polyvinyl acetal, polyvinyl alcohol, polyolefin, polyurethane, polystyrene or copolymers of these may be mentioned. The binder is contained in the internal electrode layer paste preferably by 1 to 5 wt % with respect to mixed powder of the conductive material and the main component of the adding dielectric material. When an amount of the binder is too small, the strength is liable to decline, while when too large, the metal filling density of an electrode pattern before firing declines and smoothness of the internal electrode layer 3 becomes hard to be maintained after firing in some cases.

As the solvent, any of well known solvents, such as terpineol, dihydroterpineol, butycarbitol, kerosene, etc. may be used. A content of the solvent is preferably 20 to 50 wt % or so with respect to the whole paste.

The internal electrode layer paste may contain a plasticizer. As a plasticizer, benzyl butyl phthalate (BBP) and other phthalate esters, adipic acid, phosphoric ester and glycols, etc. may be mentioned.

(2) Next, by using the dielectric layer paste and the internal electrode layer paste, a green chip is produced. When using a printing method, the dielectric layer paste and the internal electrode layer paste in a predetermined pattern are printed by stacking on a carrier sheet, cut to be a predetermined shape, and peeled from the carrier sheet to obtain a green chip. When using a sheet method, a green sheet obtained by forming the dielectric layer paste on the carrier sheet to be a predetermined thickness is formed, the internal electrode layer paste is printed thereon to be a predetermined pattern, then, the results are stacked to obtain a green chip.

Figure 3:
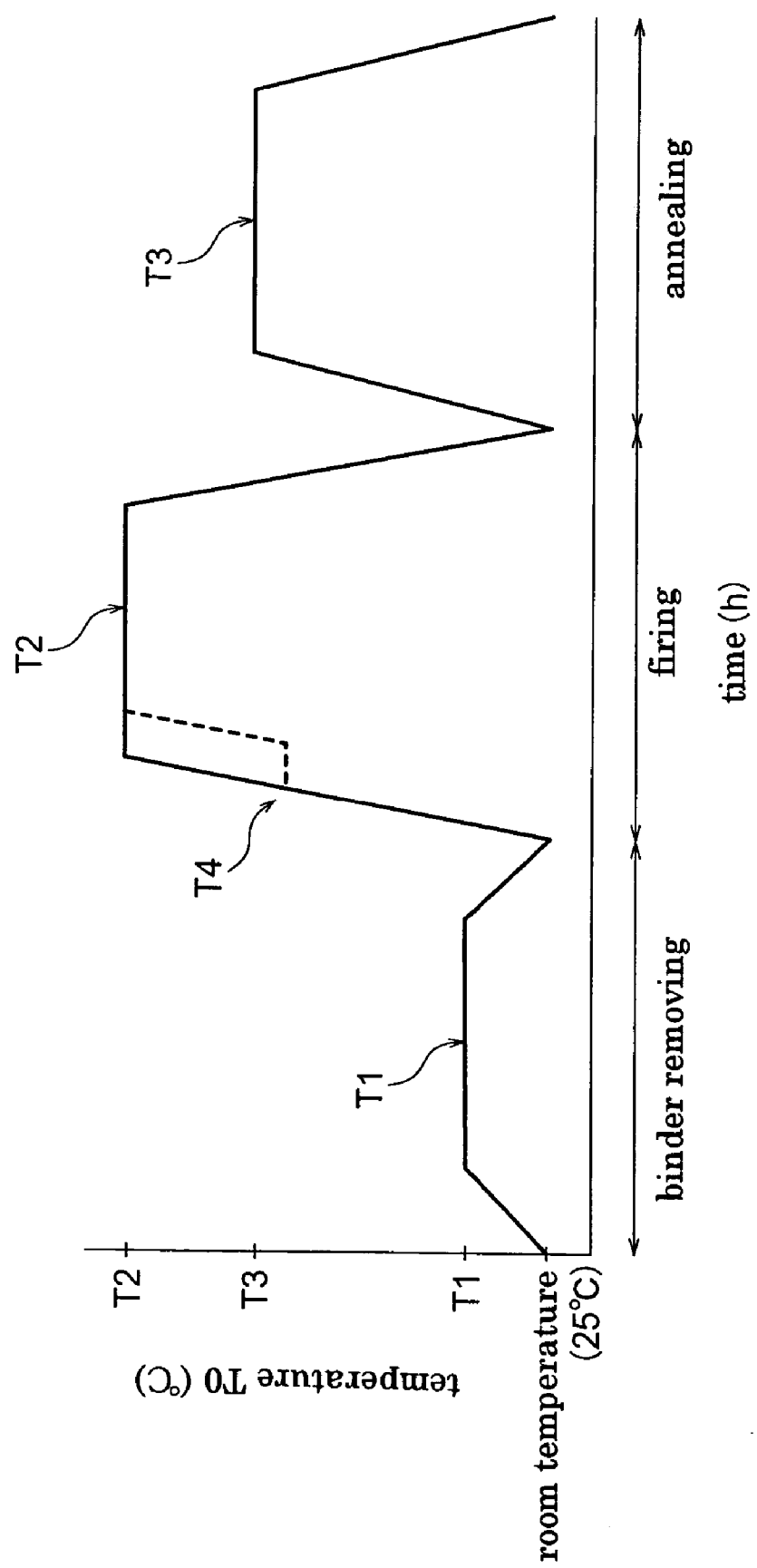
FIG. 3 is a graph of respective temperature changes in binder removing processing, firing and annealing in the embodiment.

(3) Next, the obtained green chip is subjected to binder removing. The binder removing is a step for raising an atmosphere temperature T0, for example, from the room temperature (25° C.) toward a binder removing holding temperature T1 at a predetermined temperature raising rate, holding at the T1 for a predetermined time, then, lowering at a predetermined temperature lowering rate, for example, as shown in FIG. 3.

In the present embodiment, the temperature raising rate is preferably 5 to 300° C./hour, more preferably 10 to 100° C./hour.

The binder removing holding temperature T1 is preferably 200 to 400° C., and more preferably 220 to 380° C. The holding time at the T1 is preferably 0.5 to 24 hours, and more preferably 2 to 20 hours.

The temperature lowering rate is preferably 5 to 300° C./hour, more preferably 10 to 100° C./hour.

The atmosphere for the binder removing processing is preferably in the air or in a reducing atmosphere. As an atmosphere gas in a reducing atmosphere is preferably, for example, a wet mixed gas of $N_2$ and $H_2$. An oxygen partial pressure in the processing atmosphere is preferably $10^{-45}$ to $10^5$ Pa. When the oxygen partial pressure is too low, the binder removing effect declines, while when too high, the internal electrode layer is liable to be oxidized.

(4) Next, a green chip is fired. The firing is a step for raising the atmosphere temperature T0, for example, from the room temperature (25° C.) toward a firing holding temperature T2 at a predetermined temperature raising rate, holding at the T2 for a predetermined time, and lowering the atmosphere temperature at a predetermined temperature lowering rate, for example, as shown in FIG. 3 (refer to a solid line portion in FIG. 3).

In the present embodiment, the temperature raising rate is preferably 50 to 500° C./hour, more preferably 100 to 300° C./hour.

The firing holding temperature T2 is preferably 1100 to 1300° C., more preferably 1150 to 1250° C. The holding time at the T2 is preferably 0.5 to 8 hours, more preferably 1 to 3 hours. When the T2 is too low, densification becomes insufficient even when the holding time at the T2 is made long, while when too high, breaking of electrodes due to abnormal sintering of the internal electrode layer, deterioration of the capacitance-temperature characteristic due to dispersion of the conductive material composing the internal electrode layer, and reducing of the dielectric ceramic composition composing the dielectric layer are liable to be caused.

The temperature lowering rate is preferably 50 to 500° C./hour, more preferably 150 to 300° C./hour.

The processing atmosphere of firing is preferably a reducing atmosphere. As an atmosphere gas in a reducing atmosphere, for example, a wet mixed gas of $N_2$ and $H_2$ is preferable. Particularly, in firing, it is preferable to raise the temperature to the binder removing holding temperature T1 in a $N_2$ gas or a wet $N_2$ gas atmosphere, then, change the atmosphere and continue to raise the temperature. After cooling to a holding temperature T3 for annealing, it is preferable to change the atmosphere again to a $N_2$ gas or a wet $N_2$ gas and continue cooling.

An oxygen partial pressure in the firing atmosphere is preferably $6 \times 10^{-9}$ to $10^{-4}$ Pa. When the oxygen partial pressure is too low, the conductive material of the internal electrode layer causes abnormal sintering and results in breaking, while when too high, the internal electrode layer is liable to be oxidized.

In the present embodiment, as shown in a dotted line in FIG. 3, the atmosphere temperature T0 may be held at a predetermined temperature T4 before reaching the T2 for a predetermined time, then, raised to the firing holding temperature T2. By keeping for a predetermined time at the T4 before reaching the T2, it is possible to obtain an effect of making the D50e/D50d value larger (improvement of the bias characteristic at 85° C.) and an effect of obtaining a desired structure even when using a main component of an adding dielectric material having a lower pH than 8. Also, when using a main component of an adding dielectric material having a pH of 8 or higher, due to the above processing, it becomes furthermore easier to adjust to the desired structure, consequently, the bias characteristic at 85° C. is furthermore improved. Namely, by keeping for a predetermined time at the T4 before reaching the T2, a desired structure can be obtained, consequently, the bias characteristics at 85° C. can be improved in an obtained multilayer ceramic capacitor 1.

The T4 in this case is preferably 400 to 1050° C., more preferably 600 to 1000° C. The holding time at the T4 is preferably 0.5 to 10 hours, more preferably 1 to 2 hours.

(5) Next, when firing a green chip in a reducing atmosphere, it is preferable to successively perform thermal treatment (annealing). Annealing is processing to re-oxidize the dielectric layer and, thereby, characteristics of a finally obtained capacitor are obtained.

Annealing is a step for raising an atmosphere temperature T0, for example, from the room temperature (25° C.) toward an annealing holding temperature T3 at a predetermined temperature raising rate, holding the T3 for a predetermined time and lowering the atmosphere temperature T0 at a predetermined temperature lowering rate.

In the present embodiment, the temperature raising rate is preferably 100 to 300° C./hour, more preferably 150 to 250° C./hour.

The annealing holding temperature T3 is preferably 800 to 1100° C., more preferably 900 to 1100° C. The holding time at the T3 is preferably 0 to 20 hours, more preferably 2 to 10 hours. When the T3 is too low, oxidization of the dielectric layer 2 becomes insufficient, so that it is liable that the IR becomes low and the IR lifetime becomes short. When the T3 is too high, not only the internal electrode layer 3 is oxidized to reduce the capacity, but also the internal electrode layer 3 reacts with a dielectric base material, and it is liable to easily cause deterioration of the capacity-temperature characteristic, deterioration of the IR and deterioration of the IR lifetime.

The temperature lowering rate is preferably 50 to 500° C./hour, more preferably 100 to 300° C./hour.

A processing atmosphere of annealing is preferably a neutral atmosphere. As an atmosphere gas in a neutral atmosphere, for example, a wet $N_2$ gas is preferably used. In annealing, the atmosphere may be changed after raising the temperature to the holding temperature T3 in a $N_2$ gas atmosphere, or the entire annealing process may be performed in a wet $N_2$ gas atmosphere. An oxygen partial pressure in the annealing atmosphere is preferably $2 \times 10^{-4}$ to 1 Pa. When the oxygen partial pressure is too low, re-oxidization of the dielectric layer 2 is difficult, while when too high, the internal electrode layer 3 is liable to be oxidized.

In the present embodiment, the annealing may be composed only of a temperature raising step and a temperature lowering step. Namely, the temperature holding time may be zero. In this case, the holding temperature T3 is the same as the highest temperature.

In the above binder removing processing, firing and annealing, for example, a wetter, etc. may be used to wet a $N_2$ gas and a mixed gas, etc. In this case, the water temperature is preferably 0 to 75° C. or so.

As a result of the processing explained above, a capacitor element body 10 composed of a sintered body is formed.

(6) Next, an external electrode 4 is formed on the obtained capacitor element body. The external electrode 4 can be formed by a well known method of polishing end faces of the capacitor element body 10 composed of the above sintered body, for example, by barrel polishing and sand-blasting, then, burning on the both end faces an external electrode paste normally including at least one kind of Ni, Pd, Ag, Au, Cu, Pt, Rh and Ir, etc. or an alloy of these, or applying an In—Ga alloy, etc. In accordance with need, a covering layer may be formed by soldering, etc. on a surface of the external electrode 4.

An embodiment of the present invention was explained above, but the present invention is not at all limited to the above embodiment and may be naturally embodied in a various ways within the scope of the present invention.

For example, in the above embodiment, the binder removing processing, firing and annealing are performed independently, but the present invention is not limited to this and at least two steps may be successively performed. When performing successively, it is preferable that, after the binder removing processing, the atmosphere is changed without cooling, continuously, the temperature is raised to the firing holding temperature T2 to perform firing, then cooled, and the atmosphere is changed when reaching to the annealing holding temperature T3 to perform annealing.

EXAMPLES

Below, the present invention will be explained based on further detailed examples, but the present invention is not limited to these examples.

Production of Dielectric Layer Paste

First, a dielectric material, a PVB (polyvinyl butyral) resin as a binder, DOP (dioctylphthalate) as a plasticizer, and ethanol as a solvent were prepared. The dielectric material was produced by performing wet mixing by a ball-mill for 16 hours on 0.2 mole % of $MnCO_3$, 0.5 mole % of MgO, 0.3 mole % of $V_2O_5$, 2 mole % of $Y_2O_3$, 3 mole % of $CaCO_3$, 3 mole % of $BaCO_3$ and 3 mole % of $SiO_2$ as subcomponent materials with respect to $BaTiO_3$ having an average particle diameter of 0.2 µm or so as a main component material, and drying the result.

Next, 10 wt % of the binder, 5 wt % of the plasticizer and 150 wt % of the solvent with respect to the dielectric material were respectively weighed, kneaded by a ball-mill, and made to be slurry to obtain a dielectric layer paste.

Production of Internal Electrode Layer Paste

Ni particles having an average particle diameter of 0.2 µm as a conductive material, a main component of an adding dielectric material having the same composition as that of the dielectric material contained in the dielectric layer paste and having an average particle diameter and a pH shown in Table 1, an ethyl cellulose resin as a binder, and terpineol as a solvent were prepared. The average particle diameter and pH of the main component of the adding dielectric material in Table 1 are values (an average particle diameter of 0.025 to 0.3 µm and a pH of 7.5 to 11) of $BaTiO_3$ as a main component material used in producing the dielectric material. Note that the pH value in Table 1 is a value obtained by adding 30 g of $BaTiO_3$ as material powder to 100 ml of ion-exchange water, agitating the result by ultrasonic dispersion for 5 minutes, leaving it still for 100 hours, then, measuring the supernatant portion by a pH meter.

Next, 20 wt % of the main component of the adding dielectric material was added to the conductive material. Mixed powder of the conductive material and the main component of adding dielectric material was added with weighed 5 wt % of the binder and 35 wt % of the solvent, and the result was kneaded by a ball-mill and made to be slurry to obtain an internal electrode paste.

Production of Multilayer Ceramic Chip Capacitor Samples

By using the obtained dielectric layer paste and the internal electrode layer paste, a multilayer ceramic chip capacitor 1 shown in FIG. 1 was produced as explained below.

First, by applying the dielectric layer paste on a PET film to a predetermined thickness by the doctor blade method and drying, a ceramic green sheet having a thickness of 1.5 µm was formed. In the present example, the ceramic green sheet is referred to as a first green sheet and prepared by two or more.

On the obtained first green sheet, the internal electrode layer paste was formed to be a predetermined pattern by a screen printing method to obtain a ceramic green sheet having an electrode pattern of a thickness of 1.5 µm. In the present example, this ceramic green sheet is referred to as a second green sheet and prepared by two or more.

The first green sheets were stacked to be a thickness of 300 µm to form a green sheet group. On the green sheet group, five of the second green sheets were stacked, furthermore, a same green sheet group as above was formed by being stacked thereon, and the result was heated and pressurized under a condition of a temperature of 80° C. and a pressure of 1 ton/cm² to obtain a green multilayer body.

Next, the obtained multilayer body is cut to be a size of a length of 3.2 mm×a width of 1.6 mm×a height of 1.0 mm, and subjected to binder removing processing, firing and annealing under the conditions below to obtain a sintered body. FIG. 3 shows a graph of respective temperature changes in the binder removing processing, firing and annealing.

The binder removing was performed under a condition that a temperature raising rate was 30° C./hour, a holding temperature T1 was 250° C., a holding time was 8 hours, a temperature lowering rate was 200° C./hour, and a processing atmosphere was in the air.

Firing was performed under a condition that a temperature raising rate was 200° C./hour, a holding temperature T2 was 1240° C., a holding time was 2 hours, a temperature lowering rate was 200° C./hour, and a processing atmosphere was in a reducing atmosphere (a mixed gas of $N_2$ and $H_2$ was adjusted by passing through steam under an oxygen partial pressure of $10^{-6}$ Pa).

The annealing was performed under a condition that a temperature raising rate was 200° C./hour, a holding temperature T3 was 1050° C., a holding time was 2 hours, a temperature lowering rate was 200° C./hour, and a processing atmosphere was in a neutral atmosphere (a $N_2$ gas was adjusted by passing through steam under an oxygen partial pressure of 0.1 Pa).

Note that in samples 3-1, 5, 6, 10 and 13, the atmosphere temperature was held at a temperature T4 (800 to 1000° C. in the present embodiment) before reaching to the holding temperature T2 (1220 to 1300° C. in the present embodiment) for a predetermined time (1 to 2 hours in the present embodiment), then, raised to the T2, as shown in a dotted line in FIG. 3.

A particle diameter D was obtained by cutting the obtained sintered body on a face perpendicular to the stacking direction of the internal electrode layers, polishing the face, performing thermal etching processing (at 1200° C. for 10 minutes), observing the particles by a scanning electronic microscope (SEM), converting a particle area to a circle area, and multiplying the diameter by 1.5.

For measuring electric characteristics, end faces of the obtained sintered body were polished by sandblasting, then, an In—Ga alloy was applied to form a test electrode, so that multilayer ceramic chip capacitor samples were obtained. Dimensions of the capacitor samples were a length of 3.2 mm×a width of 1.6 mm×a height of 1.0 mm. A thickness of the dielectric layer 2 was 1.0 µm, and a thickness of the internal electrode layer 3 was 1.2 µm.

A bias characteristic at 85° C. was evaluated on the obtained capacitor samples. The bias characteristic of capacitors at 85° C. was evaluated by measuring the obtained capacitor samples by an LCR meter under 1 kHz, 0.7 Vrms and a bias voltage of 2.6 V in a constant chamber held at 85° C., and calculating a capacity change rate from a value measured without applying a bias voltage at 20° C. The evaluation standard was set that those becoming higher than −21.0% were preferable. The results are shown in Table 1.

the (D50e/D50d) value was too large as 3.00, so that the defective rate of the initial insulation resistance (IR) was increased and the IR defective was extremely much, therefore, the bias characteristic at 85° C. was not evaluated.

On the other hand, it was confirmed that, in the samples 1 to 6 in the range of the present invention, the electrostatic capacity change rate from 25° C. to 85° C., wherein the reference was 20° C., was within ±10%, and the bias characteristic at 85° C. was excellent. Particularly, in the sample 3-1, it is known that the (D50e/D50d) value was larger and an effect of improving the bias characteristic was larger comparing with that in the sample 3.

What is claimed is:

1. A multilayer ceramic capacitor, having an internal electrode layer and a dielectric layer having a thickness of 3.5 µm or less, wherein:

said dielectric layer is composed of contact dielectric particles contacting said internal electrode layer and noncontact dielectric particles not contacting said internal electrode layer; and

TABLE 1

| Sample | BaTiO$_3$ contained in Internal Electrode Layer Paste | | Firing | | Average Particle Diameter | | | Bias | |
|---|---|---|---|---|---|---|---|---|---|
| | pH | Average Particle Diameter µm | Temperature T4 ° C. | Holding Time h | Temperature T4 ° C. | Contact Dielectric Particles D50e µm | Noncontact Dielectric Particles D50d µm | D50e/D50d | Characteristic TC85C/20C-bias | Evaluation |
| 1 | 8 | 0.05 | — | — | 1250 | 0.255 | 0.195 | 1.31 | −20.8 | ○ |
| 2 | 11 | 0.05 | — | — | 1270 | 0.240 | 0.180 | 1.33 | −20.3 | ○ |
| 3 | 10 | 0.05 | — | — | 1250 | 0.240 | 0.170 | 1.42 | −19.7 | ○ |
| 3-1 | 10 | 0.05 | 800 | 2 | 1220 | 0.278 | 0.120 | 2.32 | −19.0 | ○ |
| 4 | 11 | 0.025 | — | — | 1220 | 0.180 | 0.125 | 1.45 | −17.8 | ○ |
| 5 | 7.5 | 0.05 | 800 | 1 | 1220 | 0.204 | 0.120 | 1.70 | −18.0 | ○ |
| 6 | 7.5 | 0.05 | 800 | 2 | 1220 | 0.234 | 0.117 | 2.00 | −15.5 | ○ |
| *7 | 7.5 | 0.1 | — | — | 1250 | 0.180 | 0.160 | 1.13 | −22.0 | x |
| *8 | 7.5 | 0.1 | — | — | 1250 | 0.215 | 0.183 | 1.17 | −22.0 | x |
| *9 | 7.5 | 0.1 | — | — | 1250 | 0.360 | 0.320 | 1.13 | −23.0 | x |
| *10 | 7.5 | 0.3 | 800 | 2 | 1300 | 0.500 | 0.320 | 1.56 | −23.0 | x |
| *11 | 7.5 | 0.2 | — | — | 1240 | 0.360 | 0.320 | 1.13 | −23.0 | x |
| *12 | 7.5 | 0.2 | — | — | 1280 | 0.228 | 0.190 | 1.20 | −21.0 | x |
| *13 | 7.5 | 0.05 | 1000 | 2 | 1300 | 0.450 | 0.150 | 3.00 | — | x |

"*" indicates a comparative example in the Table.

As shown in Table 1, in the samples 7 to 9 and 11 to 12, wherein (D50e/D50d) is out of a range of more than 1.20 but less than 3.00, the bias characteristic at 85° C. is deteriorated. Even when the (D50e/D50d) is in the range of the present invention, the bias characteristic at 85° C. is deteriorated also in the sample 10, wherein the D50e is out of a range of less than 0.450 µm. Note that in a sample 13, an average particle diameter of the contact dielectric particles is D50e and an average particle diameter of the noncontact dielectric particles is D50d, D50e<0.450 µm and 1.20<(D50e/D50d)<3.00 are satisfied.

* * * * *